United States Patent [19]

Finn, III

[11] 4,363,641

[45] Dec. 14, 1982

[54] LIQUID DEGASSER WITH SELF-THROTTLING EXHAUST ORIFICE

[75] Inventor: George A. Finn, III, Dalton, Mass.

[73] Assignee: General Electric Company, Schenectady, N.Y.

[21] Appl. No.: 279,704

[22] Filed: Jul. 2, 1981

[51] Int. Cl.³ .............................................. B01D 19/00
[52] U.S. Cl. ...................................... 55/205; 55/460; 251/9
[58] Field of Search .................. 55/170, 184, 203–205, 55/459 R, 460; 209/144, 211; 210/512.1; 251/9, 10

[56] References Cited

U.S. PATENT DOCUMENTS

| | | | |
|---|---|---|---|
| Re. 27,882 | 1/1974 | Burnham, Sr. | 55/41 |
| 928,546 | 7/1909 | Schneible | 55/204 |
| 2,323,525 | 7/1943 | Ebel et al. | 55/205 |
| 2,401,079 | 5/1946 | Jones et al. | 55/205 X |
| 2,434,596 | 1/1948 | Spieth | 55/205 X |
| 2,578,568 | 12/1951 | Mayer et al. | 55/205 |
| 2,955,916 | 10/1960 | Guyer et al. | 55/204 X |
| 3,044,236 | 7/1962 | Bearden et al. | 55/204 |
| 3,140,734 | 7/1964 | Chauvin | 251/9 X |
| 3,282,030 | 11/1966 | Griffo et al. | 55/205 X |
| 3,359,708 | 12/1967 | Barber | 55/205 X |
| 3,828,524 | 8/1974 | Booth et al. | 55/199 X |
| 4,097,358 | 6/1978 | Wiseman | 55/204 X |
| 4,273,563 | 6/1981 | Fadda et al. | 55/204 X |

Primary Examiner—Robert H. Spitzer

[57] ABSTRACT

A centrifugal (cyclone) separator for extracting entrained gas from a liquid which includes a cylindrical member carrying vanes which extend into the vortex created by fluid swirling through the separator. The cylindrical member is mounted for rotation about a fixed member in response to action of the fluid on the vanes and relative motion between the cylindrical member and the fixed member opens and closes a valve in the gas escape route to shut the valve when the quantity of gas in the votex is low enough to expose the vanes to the liquid.

2 Claims, 5 Drawing Figures

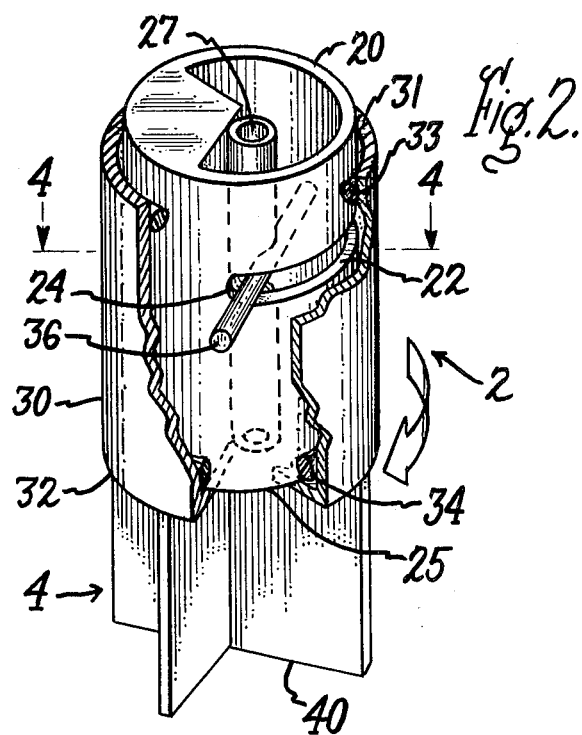
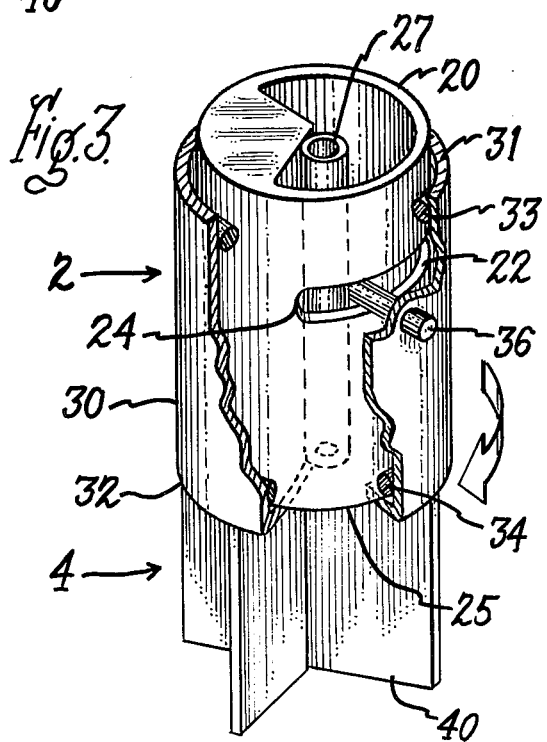

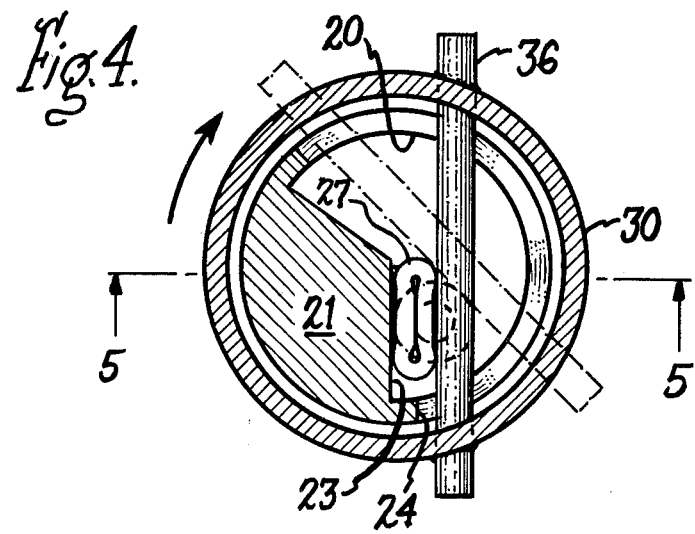
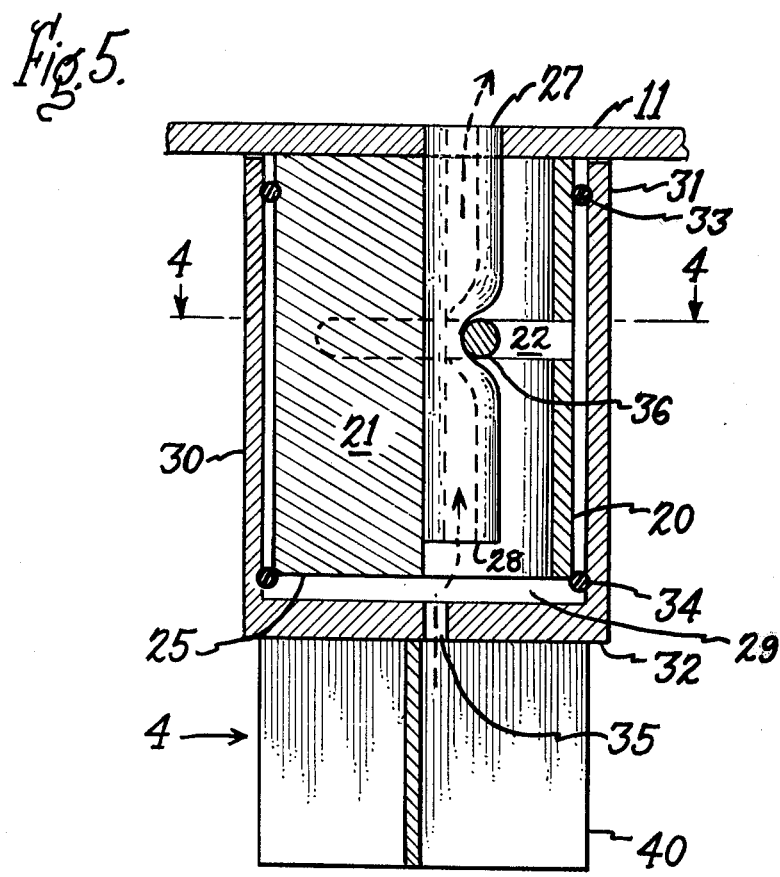

LIQUID DEGASSER WITH SELF-THROTTLING EXHAUST ORIFICE

The U.S. Government has rights in this invention pursuant to Contract No. N00024-79-C-6276 awarded by the Department of the Navy.

BACKGROUND OF THE INVENTION

1. Field of the Invention

This invention pertains to the removal of gas from a liquid in which it has become entrained and particularly those applications in which a small quantity of gas must be removed from a liquid where it would be beneficial to have no gas present. Examples of application of this system are hydraulic systems and electrolyte management systems, systems in which a small quantity of gas can have highly undesirable effects.

2. Background Art

Cyclone or centrifugal separators have been used in many applications to separate one substance from another on the basis of mass, whether or not those substances are of the same or different physical states and particularly for the separation of fluids including separation of light liquids from heavy liquids and gases from liquids. Several devices in the prior art which are cylindrical or conical in shape can be described as being symmetrical about a vertical axis and have an inlet port near the top of the structure for the introduction, tangentially of the interior surface of the structure, of a fluid mixture, e.g., a liquid bearing an entrained gas and having two exit ports, one centrally located at the top of the structure for the lighter fluid, e.g., escaping gas, and the other at the bottom for the exit for the heavier, e.g., a degassed liquid. Schneible, U.S. Pat. No. 928,546, July 20, 1909, and Wiseman, U.S. Pat. No. 4,097,358, June 27, 1978, are examples of such basic configuration.

In some applications, valves of one type or another have been used for control of rates of flow, length of dwell time or pressure within a system or for other reasons. Examples of such structures are found in the density of valve 15 of Burnham, U.S. Pat. No. Re. 27,882, Jan. 15, 1974; pressure valve 8 of Schneible, U.S. Pat. No. 928,546, July 20, 1909; pressure valve 13 of Guyer et al., U.S. Pat. No. 2,955,916, Oct. 11, 1960; flow control valve 20 of Bearden et al., U.S. Pat. No. 3,044,236, July 17, 1962; and back pressure device 33 and blower 40 of Booth et al., U.S. Pat. No. 3,828,524, Aug. 13, 1974. Of these control devices, the back pressure device 33 and the blower 40 of Booth et al. are pertinent to the present invention because they are directed to a control of the output of a separator for a purpose related to the content of the output.

SUMMARY OF THE INVENTION

This invention provides a specific structure for use with a fluid separator for the removal of an entrained gas from a liquid where a quantity of the gas to be removed from the liquid is either small or variable or both and where there is a benefit in precluding loss of the liquid through the gas exhaust as, for example, the removal of free hydrogen from an electrolyte in an electrolyte management system for a primary electrochemical system as, for example, a seawater battery. The structure forms a part of a cyclone separator which can be cylindrical or conical or a combination of the two shapes, but normally of circular cross section, and characteristically has a tangentially directed input port at one end of the structure for receiving a mixture of materials to be separated. A discharge port is located at or near the opposite end of the separator for the discharge of the more dense material, i.e., liquid in the case of separation of gaseous material from a mixture of liquid and gas. The structure also includes a gas discharge orifice at the inlet end of the structure and a device proximate to the gas discharge orifice for controlling the rate of passage of gas, the latter being the structure to which this invention is directed. The novel structure for controlling the rate of passage of gas to the discharge orifice includes a conduit for gas from the vortex region of the separator to an external port and means for controlling the rate of flow of gas through that conduit as, for example, some form of valve and valve actuating mechanism responsive to conditions within the separator for opening and closing the valve. In the concept of this invention, the device for opening and closing the valve is responsive to the amount of gas present in the vortex area of the separator and includes a valve which is resiliently biased to open, an actuating member which closes the valve in response to a force, and a movable member which exerts a force inversely proportional to the amount of gas in the vortex. Maximum force is exerted to close the valve when there is very little gas in the vortex to prevent the escape of liquid through the gas orifice. The movable member exerting the force on the actuator is a rotatable structure in the vortex area which has fins or vanes to convert the force on the vanes of the liquid flowing about the vortex to a valve actuating force. The force generated is proportional to the area of the vanes impacted by the liquid at any particular time and, therefore, inversely proportional to the volume of gas in the vortex which can be large enough to prevent the liquid from contacting the vanes.

BRIEF DESCRIPTION OF THE DRAWINGS

FIG. 2 is a perspective, partly in section, of an embodiment of the invention.

FIG. 3 is a perspective, similar to FIG. 2, of the valve and valve control structure with the valve open.

FIG. 4 is a cross section of the structure of FIGS. 2 and 3 taken as indicated along the line 4—4 on FIG. 2.

FIG. 5 is a vertical view, partly in section, of the device shown in FIGS. 2, 3 and 4 along the line 5—5 on FIG. 4.

DETAILED DESCRIPTION

Figure 1:
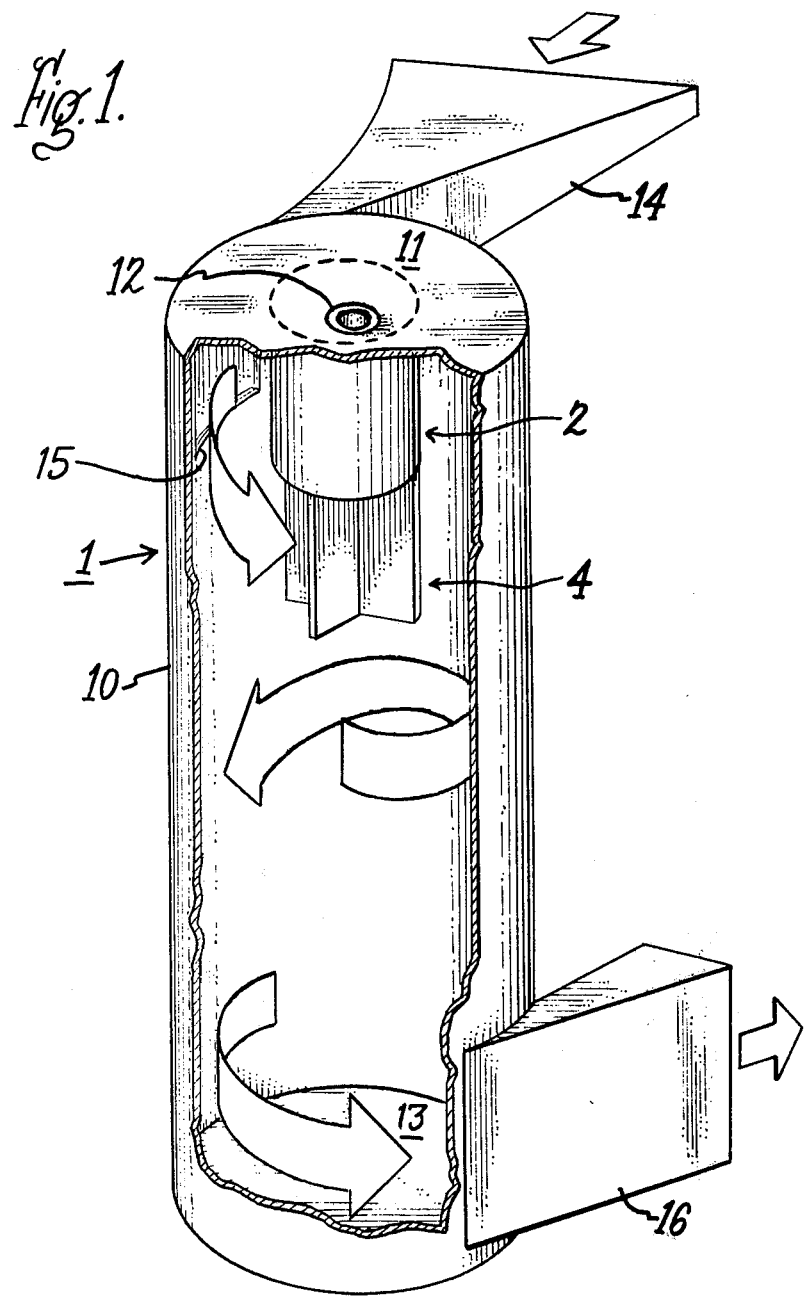
FIG. 1 is an elevation, partly in section, of a cyclone separator according to the invention.

Many systems using or dependent on fluids encounter contamination problems which can be detrimental or even dangerous in system operation, particularly where two different physical states of substances are involved as, for example, the presence of air in a hydraulic system, an explosive gas in an electrolyte system or condensation of water in a pressurized air system which require removal of the contaminating substance. As noted with respect to the prior art, cyclone separators have been used to separate liquids and gases in both liquid and gas systems. The present invention is directed toward an improved cyclone separator for the removal of an entrained gas from a liquid management system and has specific utility in those applications in which the quantity of entrained gas is small or variable or both and the ingestion of liquid into the gas escape passage is undesirable, if only to conserve the liquid. In particular, this invention is directed to the removal of hydrogen gas from the electrolyte in a battery system.

In FIG. 1, there is a cylindrical cyclone separator 1 made up of a body portion or vessel 10, a top or first end wall 11, an opening 12 for gas discharge, a bottom or second end wall 13, an input duct 14 leading to an inlet port 15 at the top or first end of the body, and an outlet duct 16 for the more dense output located at the bottom or second end of the separator. Although the body 10 of the separator is illustrated as cylindrical, it may be conical or a combination of both having a circular cross section. Although as illustrated the separator is symmetrical about a vertical axis with the input end being at the top, this orientation is not limiting on the invention as in normal circumstances in which a separator would be used in a system having pressures sufficiently in excess of gravity, the separator will operate without regard to orientation. The separator also includes regulator structure 2 which is the subject matter of this invention.

The regulator structure 2, as illustrated in FIGS. 2 and 5, is made up of a fitted pair of coaxial cylindrical cans 20 and 30. Inner can 20 has one end secured to the end wall 11 of vessel 10 and includes an interior structural member 21 which is shown in FIG. 4 as an integral solid sector having at least one surface 23 which extends relatively radially of the can 20 and is located proximate to the gas discharge opening 12 in the end wall 11 of vessel 10 which, in the embodiment illustrated, is offset from the can axis. Structural member 21 could alternatively be implemented with sheet material as a single radial piece or a wedge-shaped piece defining a sector of the cylinder. The inner can 20 also has a circumferential slot 22 approximately midway of its length which extends somewhat in excess of 180° around the circumference of can 20 with one end 24 of the slot being close to the radial surface 23 of structural member 21. Can 20 also includes a length of resilient tubing 27 extending approximately its length from the gas discharge opening 12 in end wall 11 to the end 25 of the inner can 20. End 25 of the can may or may not be closed, the limitation being that the tubing must perform the mission of conveying gas from the exterior of can 20 at the end 25 to the exterior of separator 1 through gas discharge opening 12. If can 20 is made with a solid bottom at end 25 the tubing must also extend through that end wall. In addition, the tubing may extend beyond the end wall 11 of the separator if it is convenient to use an extension of that tubing to convey the evacuated gas to another location.

Outer can 30 which has an open end 31 and a closed end 32 is journaled onto inner can 20 for rotation about the common axis of the cans by means of bearing rings 33 and 34 which serve both to provide a low friction surface to permit the rotation of can 30 about can 20 and also to form a seal to prevent the movement of fluids through the space between the cans and, therefore, assist in channeling accumulating gas into and through the resilient tubing 27. Closed end 32 of outer can 30 is also provided with an orifice 35 to permit gas escaping from the fluid mixture in the vessel 10 to move into can 30 and thence through resilient tubing 27. For this purpose, and in the event that can 20 is fabricated with a solid end wall 25 through which resilient tubing 27 would be extended, a space 29 must be left for gas to flow from orifice 35 into the tubing irrespective of the relative rotational location of the orifice 35 and the end of tubing 27. If, however, the structure is as illustrated in FIG. 5, i.e., wherein the end 25 of can 20 is open except for structural member 21 and the intake end 28 of tubing 27 is spaced from the end 25 of can 20, then the space 29 is not necessary and the end wall of can 20 at the end 25 could bear directly on the interior surface of end wall 32 of can 30.

Outer can 30 is held in its position journaled on inner can 20 by means of a cord-like bar or rod 36 extending through the interior of cylindrical can 30 in a plane normal to the axis. The rod 36 subtends an arc less than 180° and is located so that it will lie within slot 22 of can 20, denying relative axial movement between the cans while permitting relative rotational movement about the axis. The orientation of cans 20 and 30, rod 36, slot 22 and structural member 21 is such that rotation of can 30 about its axis will move rod 36 to and from a position parallel and proximate to surface 23 of structural member 21. With resilient tubing 27 lying next to surface 23, rod 36 in moving toward surface 23 will act as a valve to pinch off the tubing and preclude flow of fluid, e.g., escaping gas.

Outer can 30 is also provided with a vane structure 4 including a plurality of vanes 40 extending radially from the can axis beyond the closed end 32 of the can. As illustrated in FIG. 1, the regulator structure and the projecting vanes extend into the interior of vessel 10 to occupy the area in which a vortex will be created by the swirling fluid mixture as it moves from inlet port 15 to outlet duct 16. The vanes 40 as located in the vortex will, on the start-up of the system, be impacted by the swirling liquid and torque outer can 30 about inner can 20 to cause rod 36 to pinch off the resilient tubing 27 and prevent flow of any fluid through the tubing. The centrifugal force imparted to the fluid mixture will also cause the lighter material, e.g., gas in use of the separator for separating a gas from a liquid, to be forced toward the axis about which the liquid is swirling resulting in an accumulation of gas in the vortex created by the rotation of the liquid. As a gas bubble in the vortex increases in size, the gas will decrease the area of the vanes impacted by the swirling liquid and eventually reach a point where the resilience of the tubing 27 can overcome the force of the liquid on the portions of the vanes 40 which are not within the gas bubble so that the resilience of the tubing material in returning to its original shape will open the tube and permit gas to flow from the separator. At such time as sufficient gas has escaped again exposing a larger area of the vanes 40 to impact by the liquid, can 30 will rotate to cause rod 36 to overcome the resilience of the tubing and again pinch off gas flow.

Accordingly, with a proper selection of materials, size and resilience of the tubing, the amount of friction between cans 20 and 30, and the size, number and location of the vanes 40, a separator can be constructed in which rod 36 and tubing 27 will cooperates to valve and control passage of gas from the separator so that gas separated from the mixture will be removed as it accumulates but enough gas will remain to prevent escape of liquid.

It is also obvious from this disclosure that other biased valve structures could be used in lieu of the resilient tubing to provide a valve structure which is actuated by the rotation of can 30 in response to torque imparted by the swirling liquid.

We claim:

1. A centrifugal separator for removing entrained gas from a liquid comprising:
   a body which is symmetrical about an axis;

an inlet port for introduction of liquid into the body to cause a spin induced vortex about said axis proximate one end of the body;

an exit port relatively remote from said one end for discharge of degassed liquid;

a gas exhaust orifice in the body proximate said one end of the body;

a first cylindrical member fixed to the interior wall of said one end of the body and extending axially of the body into the region of said vortex, said cylindrical first member including an interior inelastic structural member and an opening in its cylindrical surface;

an elastic gas conducting tube supported against said interior inelastic member for conveying gas from said vortex to said gas exhaust orifice;

a second cylindrical member supported on and surrounding said first cylindrical member for rotational movement between two positions about the common axis, said second member including a structural member passing through said opening in said first cylindrical member for pinching off said elastic gas conducting tube against said interior in elastic structural member of said first cylindrical member as said second cylindrical member is rotated from the first to the second of said two positions and for releasing said tube as it rotates from the second to the first position;

drive means comprising a vaned tangential impulse turbine structure attached to said second cylindrical member and extending into the vortex region where it is exposed to either or both of liquid or gas in said vortex depending on the amount of gas accumulated in the vortex;

said members, tube and drive means being so arranged that liquid flowing about said vortex in the presence of only a small amount of gas will drive said turbine structure to said second position to pinch off said tube and preclude the escape of gas whereas the presence of a larger amount of gas will reduce the impulse of liquid on said turbine structure and permit the inherent resiliency of said tube to rotate said second cylinder toward said first position to let gas escape through said tube whereby fluid flow through said tube is controlled to permit release of gas but to preclude release of liquid.

2. In a centrifugal separator for removing entrained gas from a liquid including a body which is symmetrical about an axis, an inlet port proximate one end of the body for introduction of liquid to flow through said body to create an axial vortex, a liquid exit port at the other end of said body and a gas exhaust port at said one end, the improvement comprising:

duct means for conveying gas from said vortex to said gas exhaust port, said duct means including a resilient tube portion; and cooperating coaxial inner and outer cylindrical members extending from said one end of the body into said vortex, said inner cylindrical member being fixed with respect to the body, said outer cylindrical member having exterior vanes in the region of the vortex and being supported on said inner member with a limited freedom of rotation about the common axis of the body and said members in response to the hydrokinetic action of liquid in said vortex region on said vanes, said cylindrical members having cooperating structural members for alternately squeezing and releasing said resilient tube portion of said duct means responsive to the direction and magnitude of rotation of said outer cylindrical member about said inner cylindrical member to cause said members to cooperatively constitute valve and valve actuator means;

whereby the hydrokinetic action of liquid on said vanes, which is inversely proportional to the quantity of gas in the vortex, will rotate said outer cylindrical member to overcome the resiliency of said resilient portion and constrict said duct means to shut off escape of gas or liquid when the quantity of gas is low and conversely will permit the resiliency of said resilient portion to overcome the hydrokinetic action to open said duct means when the quantity of gas is large.

* * * * *